United States Patent Office 2,910,400

Patented Oct. 27, 1959

1

2,910,400

PROCESS OF PRESERVING CARBOHYDRATE-CONTAINING PERISHABLE MATERIAL

Hermann Bernhard, Koln-Stammheim, Wilhelm Thoma, Leichlingen, and Hermann Genth, Krefeld-Bockum, Germany, assignors to Farbenfabriken Bayer Aktiengesellschaft, Leverkusen, Germany, a corporation of Germany No Drawing. Application April 12, 1957
Serial No. 652,378

Claims priority, application Germany April 13, 1956

2 Claims. (Cl. 167—22)

The present invention relates to preservatives; more particularly it concerns a process of preserving perishable materials which comprises incorporating in said materials pyrocarbonic acid esters corresponding to the general formula

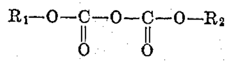

wherein $R_1$ and $R_2$ represent the same or different hydrocarbon radicals, for example alkyl radicals such as methyl, ethyl, propyl, isopropyl, butyl, isobutyl, amyl or isoamyl, or cycloalkyl radicals such as cyclohexyl, further aryl or aralkyl radicals such as phenyl and benzyl, or heterocyclic radicals such as furfuryl; these hydrocarbon radicals include radicals which are substituted, for instance by halogen.

The pyrocarbonic acid esters to be used as preservatives according to the invention may be produced by various methods, for example by reacting chloroformic acid esters with alkali metal salts of semi-esters of carbonic acid.

The proposed preservatives are used in a manner known as such: the agents are added per se or in the form of a solution or dispersion in suitable media to the materials to be preserved, for example in the form of a freshly prepared aqueous dispersion, by intimately mixing them, if necessary, with the materials which are then carefully sealed or packed.

The quantities of preservatives required can easily be determined for each case by preliminary experiments; in general, quantities of about 0.001–2 percent referred to the quantity of material to be preserved are sufficient.

It is possible to preserve perishable goods of vegetable or animal origin with the proposed preservatives in an advantageous manner. Substances which may be preserved according to the invention are especially substances containing carbohydrates including a great variety of vegetables, fruit pulp, fruit extracts or juices which are not fermented or only partly fermented, extracts of drugs, and further more casein or other protein-containing substances as well as injection solutions and other pharmaceutical or cosmetic preparations of a perishable nature. The preservatives may also be used with advantage for so-called biological preservation processes, for example for ensilage; in this way, undesirable fermentation phenomena, for example the fermentation of butyric acid, may be avoided either altogether or for a certain period.

It has been established that pyrocarbonic acid esters used as preservatives react quantitatively with compounds

2 containing reactive hydrogen atoms in the presence of water within a few hours according to the equation:

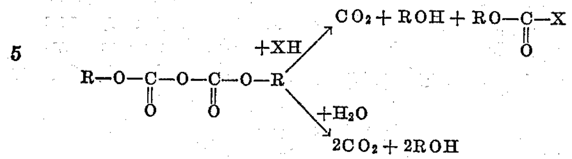

wherein X is the radical of a compound containing an active hydrogen atom. As may be seen, the esters react irreversibly. The preservation lasts, therefore, only as long as a suitable sealing or packing prevents a fresh infection. On the other hand, the substances preserved according to the invention are sensitive to fermentation processes after removing of the seal or packing, a fact which is of great importance with regard to the compatibility of substances to be digested.

Of the pyrocarbonic acid esters, the generally preferred ester is the diethyl ester since its reaction products, which chiefly comprise carbonic acid and ethyl alcohol, i.e. substances which are also natural metabolites of the yeast, are physiologically harmless.

Compared with the known sterilization of perishable substances by heat treatment, the preservatives to be used according to the invention have the advantage of not impairing the aroma or vitamin content of the substances to be preserved. In contrast to the sterilization by ultra filtration to which only filterable liquids can be subjected, the preservation with the proposed agents is not limited in this way. The preservatives decribed excel the conventional chemical preservatives by not being retained in the substances to be preserved.

The following examples serve to illustrate the invention without, however, limiting the scope thereof; the parts given are by weight.

*Example 1*

100 parts of comminuted vegetable material are intimately mixed with a freshly prepared dipersion of 0.3 part of pyrocarbonic acid diethyl ester in 1000 parts of water and the mixture is allowed to stand in a closed vessel at room temperature. The mixture does not show any change after 15 days, while a mixture without an addition of the ester begins to ferment after only one day and exhibits a strong mould infection after three days.

*Example 2*

0.25 part of pyrocarbonic acid diethyl ester is added to 100 parts of a cosmetic preparation based on powdered skimmed milk which comprises 3.9 parts of proteins, 5 parts of lactose, 0.8 part of mineral salts, 0.6 part of perfume and 89.7 parts of water; after intimate mixing of the ingredients, the preparation is stored in a closed vessel at room temperature. The preparation thus treated is unchanged after 15 days, while a mixture without the addition of the ester shows strong signs of fermentation after only one day.

*Example 3*

1000 parts of fresh fermentable grape or apple juice of pH 3.5 are intimately mixed with 0.2–0.3 part of pyrocarbonic acid diethyl ester. The juice is then bottled and the bottles are closed. The bottle contents do not show any fermentation or mould infection even after prolonged storage at room temperature.

*Example 4*

1000 parts of strawberry or apple pulp having a 10 percent sugar content and a pH value 4 are mixed with 0.5 part of pyrocarbonic acid diethyl ester and immediately bottled and sealed. The goods thus treated prove to be excellently preserved.

In the same manner, orange juice or pulp to which sugar is added, can be preserved satisfactorily.

We claim:

1. A process of preserving a perishable material containing carbohydrates which are susceptible to enzymatic decomposition through fermentation, which process comprises incorporating into said perishable material .001–2% by weight of a pyrocarbonic acid ester having the general formula

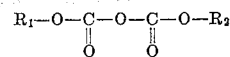

wherein $R_1$ and $R_2$ represent hydrocarbon radicals.

2. Process of claim 1 wherein the pyrocarbonic acid ester is the pyrocarbonic acid diethyl ester.

References Cited in the file of this patent

"Chemical Abstracts," vol. 49, page 6539a.

"Chemical Abstracts," vol. 45, page 6795g, 6795d.

"Chemicals Evaluated as Insecticides and Repellents," compiled by King, U.S. Dept. of Agriculture, Agriculture Handbook No. 69, pp. 109–112 (p. 110 only is relied upon).